United States Patent [19]

Aigner

[11] Patent Number: 4,782,871

[45] Date of Patent: Nov. 8, 1988

[54] STOP DEVICE FOR WOODWORKING MACHINES, PARTICULARLY PLANING MACHINES

[76] Inventor: Georg Aigner, Thannenmais, Reisbach D-8386, Fed. Rep. of Germany

[21] Appl. No.: 26,667

[22] PCT Filed: Jul. 16, 1986

[86] PCT No.: PCT/EP86/00417
§ 371 Date: Apr. 17, 1987
§ 102(e) Date: Apr. 17, 1987

[87] PCT Pub. No.: WO87/00479
PCT Pub. Date: Jan. 29, 1987

[30] Foreign Application Priority Data

Jul. 16, 1985 [DE] Fed. Rep. of Germany ....... 3525296

[51] Int. Cl.[4] .............. B27C 31/00; B27C 1/12
[52] U.S. Cl. .............. 144/253 R; 83/467 R; 144/117 R; 269/315

[58] Field of Search .............. 144/253 R, 117 R; 83/467; 269/315

[56] References Cited

U.S. PATENT DOCUMENTS

| 2,183,190 | 12/1939 | Haas | 144/253 |
| 2,719,548 | 10/1955 | Mitchell | 83/467 |
| 3,289,714 | 12/1966 | Hammer | 144/1 R |
| 3,714,856 | 2/1973 | Hall et al. | 83/467 |

FOREIGN PATENT DOCUMENTS 644297 6/1928 France .

Primary Examiner—W. Donald Bray

[57] ABSTRACT

A stop device for woodworking machines, particularly planing machines, having a stop plate (20) on the machine table (10) and an auxiliary stop ledge (22) which is pivotally mounted on said plate and is swingable from an operating position resting on the machine table (10) into a ready position. In its ready position the auxiliary stop ledge (22) is inserted into a recess (32) within the stop plate (20).

14 Claims, 4 Drawing Sheets

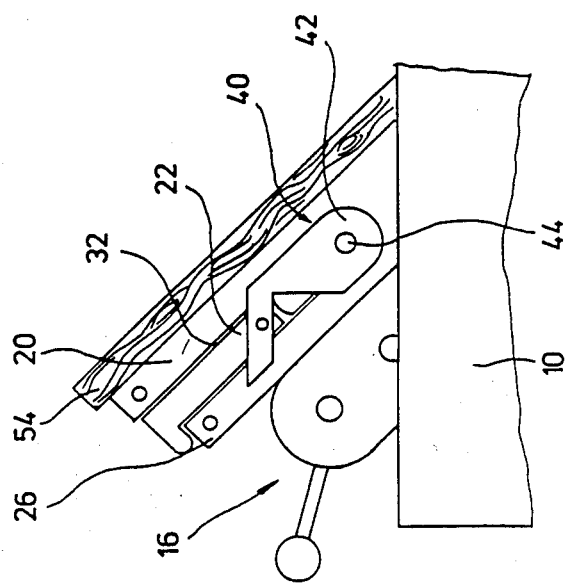

STOP DEVICE FOR WOODWORKING MACHINES, PARTICULARLY PLANING MACHINES

TECHNICAL FIELD

The present invention relates to a stop device for woodworking machines, particularly planing machines, having a stop plate on the machine table with an auxiliary stop ledge pivotally mounted on said plate and swingable from an operating position lying on the machine table into a ready position.

BACKGROUND ART

A stop device is described and shown in German Utility Model 81 35 734. When working on narrow workpieces, the auxiliary stop ledge is swung into its operating position in which it rests on the machine table, whereby small disk-shaped feet serve as spacers between the auxiliary stop ledge and the machine table. In this operating position of the auxiliary stop ledge there is no danger of the hands of the operator slipping off the workpiece and being injured by the plane knife. On the other hand, if high workpieces are to be worked, for instance for the dressing of the narrow sides of boards, the auxiliary stop ledge must be swung into its ready position. In this ready position the auxiliary stop ledge is arranged behind and above the stop plate in the known device.

The known stop device is fully functional when the stop plate is in a vertical position. However, if it is necessary to bring the stop plate into an oblique position, for which purpose its back is fastened to a suitable holding and displacement mechanism, it cannot be avoided in most cases that the auxiliary stop ledge strikes against the upward protruding holding and displacement mechanism whereby it can be damaged; furthermore, in this ready position the holding and displacement mechanism cannot be actuated. Not least of all, in this oblique position the auxiliary stop ledge cannot be swung back sufficiently far, so that it extends into the path of movement of the workpieces thus rendering the working of high workpieces impossible.

DISCLOSURE OF THE INVENTION

One of the objects of the present invention is to provide a stop device of the aforementioned type in which the auxiliary stop ledge in its ready position is arranged so that irrespective of the position of the stop plate it does not interfere with and prevent the operation of auxiliary and displacement mechanisms for placing the stop plate in an oblique position.

In accordance with the present invention this object is achieved in a stop device of the above-indicated type in the manner that, in its ready position, the auxiliary stop ledge is lowered into a recess provided in the stop plate which is fitted to the dimensions of the auxiliary stop ledge.

In this solution, the auxiliary stop ledge, in its ready position, forms a unit with the stop plate and is integrated in it so that the stop plate can be easily attached to all ordinary holding and displacement mechanisms without the auxiliary stop ledge presenting an obstacle in its ready position.

In a preferred embodiment of the present invention, the recess forms a slot which is provided in the stop plate starting from at the upper longitudinal edge thereof.

This solution has the advantage that the auxiliary stop ledge is reliably seated in its ready position without impairing the front side of the stop plate which serves as a stop surface.

In another advantageous embodiment of the present invention, the free longitudinal side of the auxiliary stop ledge which forms the stop edge is provided with a grip and guide edge which, in the operating position, protrudes upwardly therefrom.

This grip and guide edge simultaneously accomplishes two objectives. First it facilitates the handling upon the pulling of the auxiliary stop ledge out of the slot into its operating position and, secondly, it affords the operator a guide for his hand so that his hand cannot slip off during the advancing of the workpiece.

In accordance with another embodiment of the present invention, each of the two ends of the auxiliary stop ledge is pivotally connected via a swing arm to a vertically displaceable slide block which is mounted in a longitudinal guide on the corresponding end side of the stop plate.

In this connection, the auxiliary stop ledge can be pivotally attached to one arm of the substantially L-shaped swing arm while the other arm thereof is pivotally fastened to the slide block.

It is advantageous to provide between the slide block and the swing arm stop means for limiting the rotation of said swing arm to about 180° between the operating position and the ready position.

In this way, upon the swinging of the auxiliary stop ledge into the ready position, the ledge cannot be swung out beyond the slot and behind the stop plate, so that at the end of this swinging movement it can be easily lowered into the slot without the operator having to search for the precise position of the auxiliary stop ledge above the slot.

The stop means can be developed in such a manner that it comprises a pin which protrudes from the slide block and engages in a semicircular guide groove in the swing arm.

In the case of the stop device developed according to the present invention, the auxiliary stop ledge has two well-defined positions, namely, an operating position and a ready position, so that no additional auxiliary means are necessary for clamping or screwing together or the like, which would impair the operation and handling of the stop device.

BRIEF DESCRIPTION OF THE DRAWINGS

Other features and advantages of the invention can be gleaned from the following description of embodiments which are shown in the drawing, in which

FIG. 2 is an end view of the stop device with the corresponding auxiliary stop ledge in the ready position;

FIG. 3 shows the stop device in the oblique position;

DESCRIPTION OF THE PREFERRED EMBODIMENTS

Figure 1:
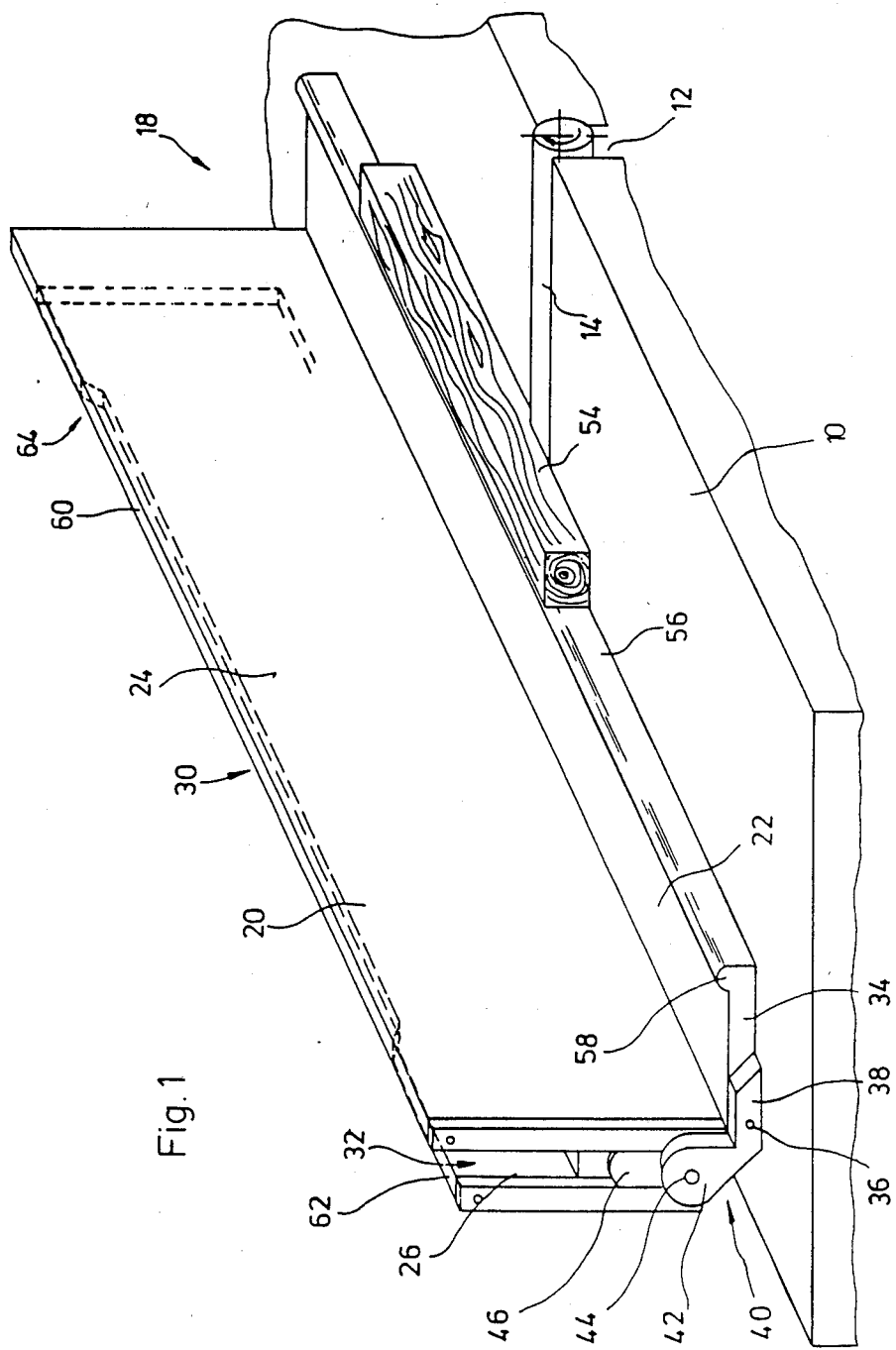
FIG. 1 is a perspective view of a stop device according to the present invention, together with a part of the planing machine to which it is fastened.

FIGS. 1 to 3 show the machine table 10 of a planing machine, the table having a slot 12 through which the knife shaft 14 protrudes upwardly. The stop device 18 developed in accordance with the present invention is fastened on the machine table 10 via a holding and displacing mechanism 16.

The stop device 18 is composed essentially of a stop plate 20 and an auxiliary stop ledge 22 mounted swingably on said plate. The stop plate 20 has a flat stop surface 24 and is fastened on its rear wall 26 facing away from said surface to the holding and displacing mechanism 16. This makes it possible to swing the stop plate 20 into an oblique position, as shown in FIG. 3. For this purpose, the lower longitudinal edge 28 of the stop plate 20 is also oblique.

A slot 32 is provided in the stop plate 20 starting from the upper longitudinal edge 30 of said plate, the slot being adapted to the dimensions of the auxiliary stop ledge 22 so that the latter can be lowered into said slot 32 in the ready position shown in FIGS. 2 and 3.

Figure 4:
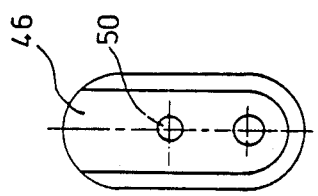
FIG. 4 is a view of the slide block.

Each of the ends 34 of the auxiliary stop ledge 22 is pivotally mounted via a pin 36 on a first arm 38 of a substantially L-shaped swing arm 40. The second arm 42 of the swing arm 40 is also pivotally fastened via a pin 44 to a slide block 46. The slide block 46, which is shown in FIGS. 4 to 6 is, in its turn, mounted in vertically displaceable manner in a slot 48 which is provided on the corresponding end edge of the stop plate 20.

Figure 6:
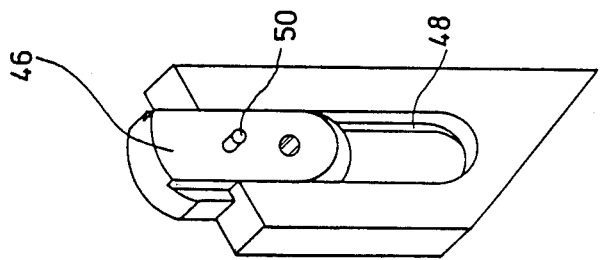
FIG. 6 is a partially cut-away view of the slide block in its longitudinal guide.
Figure 5:
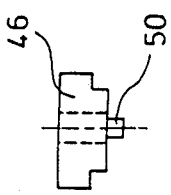
FIG. 5 is a top view of the slide block.

As shown in FIG. 5, the slide block 46 has a step-shaped cross section which engages into the correspondingly step-shaped slot 48 as shown in FIG. 6 and is securely held in this way.

Figure 8:
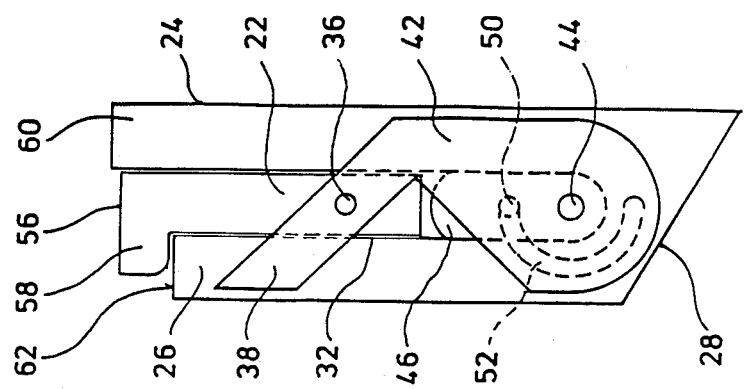
FIG. 8 is a front view of the stop device on a larger scale, with the auxiliary stop ledge in the ready position.
Figure 7:
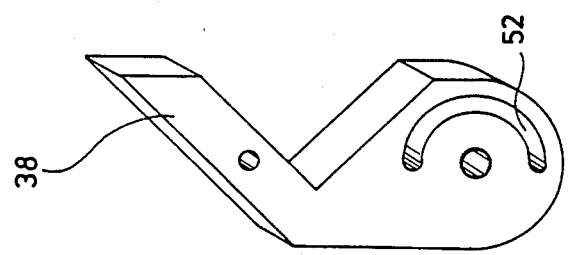
FIG. 7 is a perspective view of the swing arm.

From the slide block 46, there extends at right angles a pin 50 which engages into a semicircular guide groove 52 which is provided in the arm 42 of the swing arm 40. In this way a stop is formed which limits the rotation of the swing arm 40 from the operating position of the auxiliary stop ledge 22 shown in FIG. 1 into the ready position shown in FIGS. 2 and 8 to about 180°. As a result, the swing arm 40, upon said rotation, cannot be turned beyond the slot 32 and behind the stop plate 20, so that a dependable inserting of the auxiliary stop plate 22 from above into the slot 12 is assured.

As shown in FIG. 1, the two arms 38 and 42 of the swing arm 40 form a right angle so that, in the operating position of the auxiliary stop ledge 22, the arms do not protrude either over said ledge 22 or over the stop plate 20 and assure a disturbance-free guiding of the workpiece 54 which is to be planed.

The auxiliary stop ledge 22 is provided, on its free longitudinal side forming the stop edge 56, with a grip and guide edge 58 which protrudes upwardly when the auxiliary stop ledge 22 is in its operating position. In this way, an additional guide for the operator's hand is present on the auxiliary ledge 22, which improves safety even more. Furthermore, the grip and guide edge 58 facilitates the handling of the auxiliary stop ledge 22 upon the swinging thereof out of the operating position shown in FIG. 1 into the ready position shown in FIGS. 2 and 3, and vice versa.

As indicated in FIG. 1, the front wall 60, which limits the slot 32 in the stop plate 20 towards the stop surface 24 of said plate, is higher than its rear wall 26 which in the top 62 thereof is provided with a grip recess 64. The grip recess 64 makes it easier for the operator to grip the grip and guide edge 58 of the auxiliary stop ledge 12 upon pulling it out from the ready position.

For the sake of greater clarity of the invention, necessary protective devices such as limb protection, joint cover strips and the like have not been shown in the FIGURES.

Figure 11:
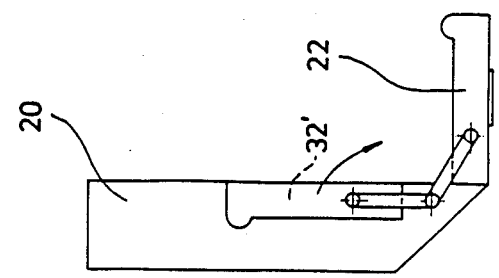
FIG. 11 shows still another embodiment of the present invention.
Figure 10:
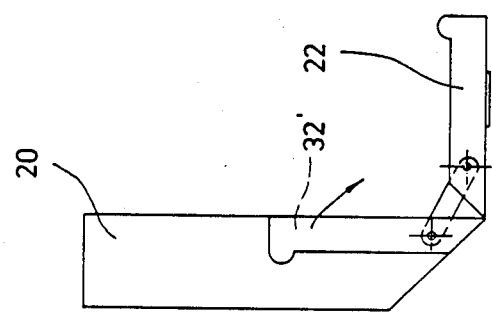
FIG. 10 shows a further embodiment of the present invention.
Figure 9:
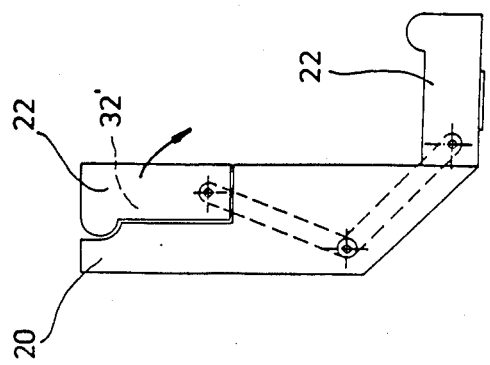
FIG. 9 shows another embodiment of the present invention.

FIGS. 9 to 11 show diagrammatically three modifications of the invention in which the auxiliary stop ledge 22 is swung and retracted into a recess 32' which is provided in the upper edge (FIG. 9), in the bottom edge (FIG. 10) or in the central region (FIG. 11) of the stop plate 20.

While I have herein shown and described a preferred embodiment of the invention and various modifications thereof, persons of ordinary skill in the art will recognize that other changes and modifications may be made therein without departing from the spirit and scope of the invention. Accordingly, the above description should be construed as illustrative, and not in a limiting sense, the scope of the invention being defined by the following claims.

What is claimed is:

1. A stop device for woodworking machines, particularly planing machines having a machine table comprising:

a stop plate comprising a front wall (60) and a rear wall (26) defining a recess therebetween;

means for attaching the stop plate to the machine table;

an auxiliary stop ledge (22) having a free longitudinal side forming a stop edge (56) and being pivotally mounted on said stop plate; said auxiliary stop ledge being swingable from an operating position resting on said machine table into a ready position into said recess in said stop plate for securely housing said auxiliary stop ledge.

2. The stop device according to claim 1, wherein said recess is formed by a slot (32) extending from the upper longitudinal edge (30) of said stop plate into said stop plate (20).

3. The stop device according to claim 1, further comprising a grip and guide edge (58) at said free longitudinal side forming said stop edge (56) of said auxiliary stop ledge (22); said grip and guide edge protruding upwardly when said auxiliary stop ledge is in said operating position.

4. The stop device according to claim 2, wherein said front wall (60) is higher than said rear wall (26) and said rear wall further comprises a grip recess (64) in the top (62) of said rear wall.

5. The stop device according to claim 2, further comprising a vertically displaceable slide block (46) mounted in a slot (48) on the edge of said stop plate (20); and a swing arm pivotally connecting an end (34) of said auxiliary stop ledge (22) to said slide block.

6. The stop device according to claim 5, wherein said swing arm (40) is substantially L-shaped and composed of a first arm (38) which is pivotally connected to said auxiliary stop ledge (22) and a second arm (42) which is pivotally connected to said slide block (46).

7. The stop device according to claim 6, further comprising stop means between said slide block (46) and said swing arm (40); said stop means limiting the swing of said swing arm (40) to about 180° between said operating position and said ready position.

8. The stop device according to claim 7, wherein said stop means comprise a pin (50) which protrudes from said slide block (46) and engages in a semi-circular guide groove (52) in said swing arm (40).

9. The stop device according to claim 2, further comprising a grip and guide edge (58) at said free longitudinal side forming said stop edge (56) of said auxiliary stop ledge (22); said grip and guide edge protruding upwardly when said auxiliary stop ledge is in said operating position.

10. The stop device according to claim 3, wherein said front wall (60) is higher than said rear wall (26) and said rear wall further comprises a grip recess (64) in the top (62) of said rear wall.

11. The stop device according to claim 9, wherein said front wall (60) is higher than said rear wall (26) and said rear wall further comprises a grip recess (64) in the top (62) of said rear wall.

12. The stop device according to claim 3, further comprising a vertically displaceable slide block (46) mounted in a slot (48) on the edge of said stop plate (20); and a swing arm pivotally connecting an end (34) of said auxiliary stop ledge (22) to said slide block.

13. The stop device according to claim 9, further comprising a vertically displaceable slide block (46) mounted in a slot (48) on the edge of said stop plate (20); and a swing arm pivotally connecting an end (34) of said auxiliary stop ledge (22) to said slide block.

14. The stop device according to claim 10, further comprising a vertically displaceable slide block (46) mounted in a slot (48) on the edge of said stop plate (20); and a swing arm pivotally connecting an end (34) of said auxiliary stop ledge (22) to said slide block.

* * * * *